(12) United States Patent
Fassett et al.

(10) Patent No.: US 11,149,580 B2
(45) Date of Patent: Oct. 19, 2021

(54) SELF RETAINED LINKAGE AND SYSTEM INCLUDING THE SELF RETAINED LINKAGE FOR A GAS TURBINE ENGINE

(71) Applicant: United Technologies Corporation, Farmington, CT (US)

(72) Inventors: Jacob Fassett, Middletown, CT (US); Slawomir Pietrzyk, Wallingford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 272 days.

(21) Appl. No.: 16/522,150

(22) Filed: Jul. 25, 2019

(65) Prior Publication Data

US 2021/0025286 A1    Jan. 28, 2021

(51) Int. Cl.
*F01D 17/16*    (2006.01)
*F01D 9/04*    (2006.01)
(Continued)

(52) U.S. Cl.
CPC ............. *F01D 17/162* (2013.01); *F01D 9/04* (2013.01); *F02C 3/04* (2013.01); *F02K 3/06* (2013.01);
(Continued)

(58) Field of Classification Search
CPC . F01D 9/04; F01D 17/12; F01D 17/14; F01D 17/141; F01D 17/162;
(Continued)

(56) References Cited

U.S. PATENT DOCUMENTS 3,313,475 A * 4/1967 Bostock, Jr. .......... F01D 17/162
                                                        415/208.2
7,322,790 B2 * 1/2008 Bouru ................... F01D 17/162
                                                        415/162
(Continued)

FOREIGN PATENT DOCUMENTS

EP    1724471 A2    11/2006
EP    1724472 A2    11/2006

OTHER PUBLICATIONS

EP Search Report for Application No. 20184740.7; dated Dec. 21, 2020.

*Primary Examiner* — Courtney D Heinle
*Assistant Examiner* — Sang K Kim
(74) *Attorney, Agent, or Firm* — Cantor Colburn LLP

(57) ABSTRACT

A variable vane assembly for a gas turbine engine, the variable vane assembly including: a plurality of vanes arranged into a plurality of stages, each one of the plurality of vanes being configured for rotation about an axis through movement of a vane arm secured to each one of the plurality of vanes at one end and a sync ring of each one of the plurality of stages at another end; and a plurality of bell cranks operably coupling the sync ring of each one of the plurality of stages to a self-retained linkage via a stud of each one of the plurality of bell cranks, the stud of each one of the plurality of bell cranks being rotatably received in a corresponding opening of the self-retained linkage in an alternating fashion such that only a single shear interface is provided between each one of the plurality of bell cranks and the self-retained linkage.

20 Claims, 4 Drawing Sheets

(51) Int. Cl.
    *F02C 3/04*          (2006.01)
    *F02K 3/06*          (2006.01)
    *F16C 3/22*          (2006.01)

(52) U.S. Cl.
    CPC .... *F05B 2260/50* (2013.01); *F05D 2220/323* (2013.01); *F05D 2220/36* (2013.01); *F05D 2230/60* (2013.01); *F05D 2250/411* (2013.01); *F05D 2260/79* (2013.01); *F16C 3/22* (2013.01)

(58) Field of Classification Search
    CPC ........... F05D 2220/323; F05D 2220/36; F05D 2230/60; F05D 2250/411; F05D 2260/50; F05D 2260/79; F05D 2270/58; F05D 2260/56; F02C 3/04; F02K 3/06; F16C 3/32
    See application file for complete search history.

(56) References Cited

U.S. PATENT DOCUMENTS

| | | |
|---|---|---|
| 9,701,412 B2 | 7/2017 | Stretton et al. |
| 10,662,804 B2 * | 5/2020 | Awtry ........................ F02C 3/06 |
| 10,704,411 B2 * | 7/2020 | Mielke .................. F01D 17/162 |
| 10,704,412 B2 * | 7/2020 | Dohse ..................... F16H 21/44 |
| 2006/0263206 A1 | 11/2006 | Bouru |
| 2006/0263207 A1 | 11/2006 | Bouru |
| 2014/0010637 A1 * | 1/2014 | Pudvah ................. F01D 17/162 |
| | | 415/130 |
| 2019/0039744 A1 | 2/2019 | Jule |

* cited by examiner

SELF RETAINED LINKAGE AND SYSTEM INCLUDING THE SELF RETAINED LINKAGE FOR A GAS TURBINE ENGINE

BACKGROUND

Exemplary embodiments of the present disclosure pertain to a self-retained linkage for actuating multiple components of a variable vane assembly of a gas turbine engine.

To connect multiple linkages of a variable vane assembly of a gas turbine engine, bushings are used to control the wear between parts. Typically, a double-shear design (clevis and plate) is used at every interface between the linkages. A double-shear design requires a bolt and a means to retain the bolt. Also, two surfaces of each of the double shear interfaces are subject to wear and frictional forces. These double shear designs require numerous parts, which adversely affects the associated costs and assembly time. Accordingly, it is desirable to reduce the number of parts and shear required when multiple linkages are connected.

BRIEF DESCRIPTION

Disclosed is a variable vane assembly for a gas turbine engine, the variable vane assembly including: a plurality of vanes arranged into a plurality of stages, each one of the plurality of vanes being configured for rotation about an axis through movement of a vane arm secured to each one of the plurality of vanes at one end and a sync ring of each one of the plurality of stages at another end; and a plurality of bell cranks operably coupling the sync ring of each one of the plurality of stages to a self-retained linkage via a stud of each one of the plurality of bell cranks, the stud of each one of the plurality of bell cranks being rotatably received in a corresponding opening of the self-retained linkage in an alternating fashion such that only a single shear interface is provided between each one of the plurality of bell cranks and the self-retained linkage.

In addition to one or more of the features described above, or as an alternative to any of the foregoing embodiments, each one of the plurality of bell cranks are also pivotally secured to a bracket.

In addition to one or more of the features described above, or as an alternative to any of the foregoing embodiments, each one of the plurality of bell cranks are operably coupled to the sync ring of each one of the plurality of stages via a link.

In addition to one or more of the features described above, or as an alternative to any of the foregoing embodiments, each one of the plurality of bell cranks are operably coupled to the sync ring of each one of the plurality of stages via a link.

In addition to one or more of the features described above, or as an alternative to any of the foregoing embodiments, an even number of the plurality of bell cranks are secured to the self-retained linkage.

In addition to one or more of the features described above, or as an alternative to any of the foregoing embodiments, an odd number of the plurality of bell cranks are secured to the self-retained linkage.

Also disclosed is a gas turbine engine, the gas turbine engine including: a fan section; a compressor section; a combustor section; a turbine section; and a variable vane assembly, the variable vane assembly including: a plurality of vanes arranged into a plurality of stages, each one of the plurality of vanes being configured for rotation about an axis through movement of a vane arm secured to each one of the plurality of vanes at one end and a sync ring of each one of the plurality of stages at another end; and a plurality of bell cranks operably coupling the sync ring of each one of the plurality of stages to a self-retained linkage via a stud of each one of the plurality of bell cranks, the stud of each one of the plurality of bell cranks being rotatably received in a corresponding opening of the self-retained linkage in an alternating fashion such that only a single shear interface is provided between each one of the plurality of bell cranks and the self-retained linkage.

In addition to one or more of the features described above, or as an alternative to any of the foregoing embodiments, each one of the plurality of bell cranks are also pivotally secured to a bracket.

In addition to one or more of the features described above, or as an alternative to any of the foregoing embodiments, each one of the plurality of bell cranks are operably coupled to the sync ring of each one of the plurality of stages via a link.

In addition to one or more of the features described above, or as an alternative to any of the foregoing embodiments, each one of the plurality of bell cranks are operably coupled to the sync ring of each one of the plurality of stages via a link.

In addition to one or more of the features described above, or as an alternative to any of the foregoing embodiments, an even number of the plurality of bell cranks are secured to the self-retained linkage.

In addition to one or more of the features described above, or as an alternative to any of the foregoing embodiments, an odd number of the plurality of bell cranks are secured to the self-retained linkage.

In addition to one or more of the features described above, or as an alternative to any of the foregoing embodiments, each one of the plurality of bell cranks are also pivotally secured to a bracket.

In addition to one or more of the features described above, or as an alternative to any of the foregoing embodiments, the variable vane assembly is located in a low pressure compressor of the compressor section of the gas turbine engine.

In addition to one or more of the features described above, or as an alternative to any of the foregoing embodiments, the variable vane assembly is located in a high pressure compressor of the compressor section of the gas turbine engine.

Also disclosed is a method of rotating a plurality of vanes of a variable vane assembly of a gas turbine, the method including the steps of: coupling a plurality of bell cranks to a plurality of stages of the variable vane assembly via a self-retained linkage, the self-retained linkage interfacing with a stud of each one of the plurality of bell cranks, the stud of each one of the plurality of bell cranks being rotatably received in a corresponding opening of the self-retained linkage in an alternating fashion such that only a single shear interface is provided between each one of the plurality of bell cranks and the self-retained linkage.

In addition to one or more of the features described above, or as an alternative to any of the foregoing embodiments, the method further includes the step of pivotally securing each one of the plurality of bell cranks to a bracket.

In addition to one or more of the features described above, or as an alternative to any of the foregoing embodiments, each one of the plurality of bell cranks are operably coupled to a sync ring of each one of the plurality of stages via a link.

In addition to one or more of the features described above, or as an alternative to any of the foregoing embodiments, an even number of the plurality of bell cranks are secured to the self-retained linkage.

In addition to one or more of the features described above, or as an alternative to any of the foregoing embodiments, an odd number of the plurality of bell cranks are secured to the self-retained linkage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
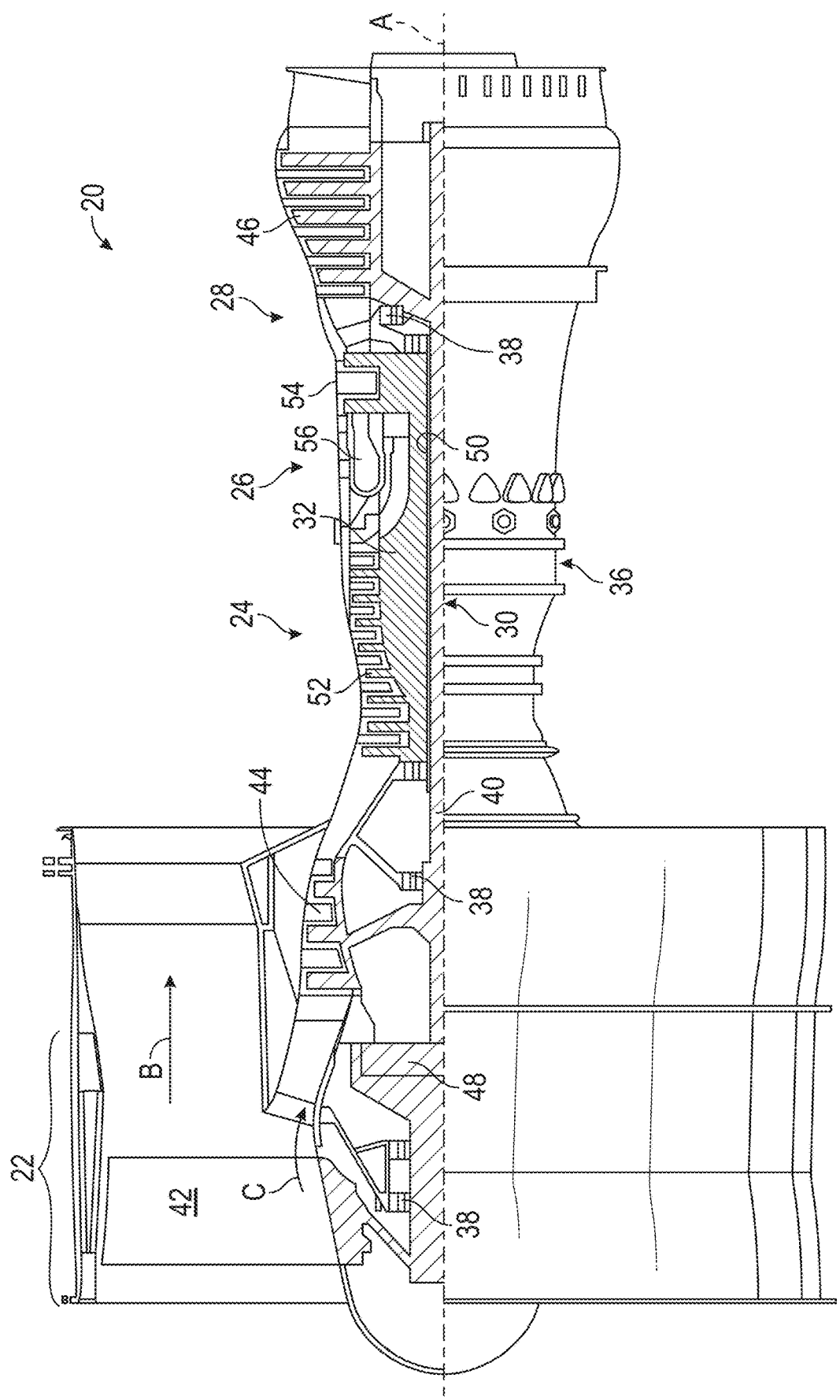
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
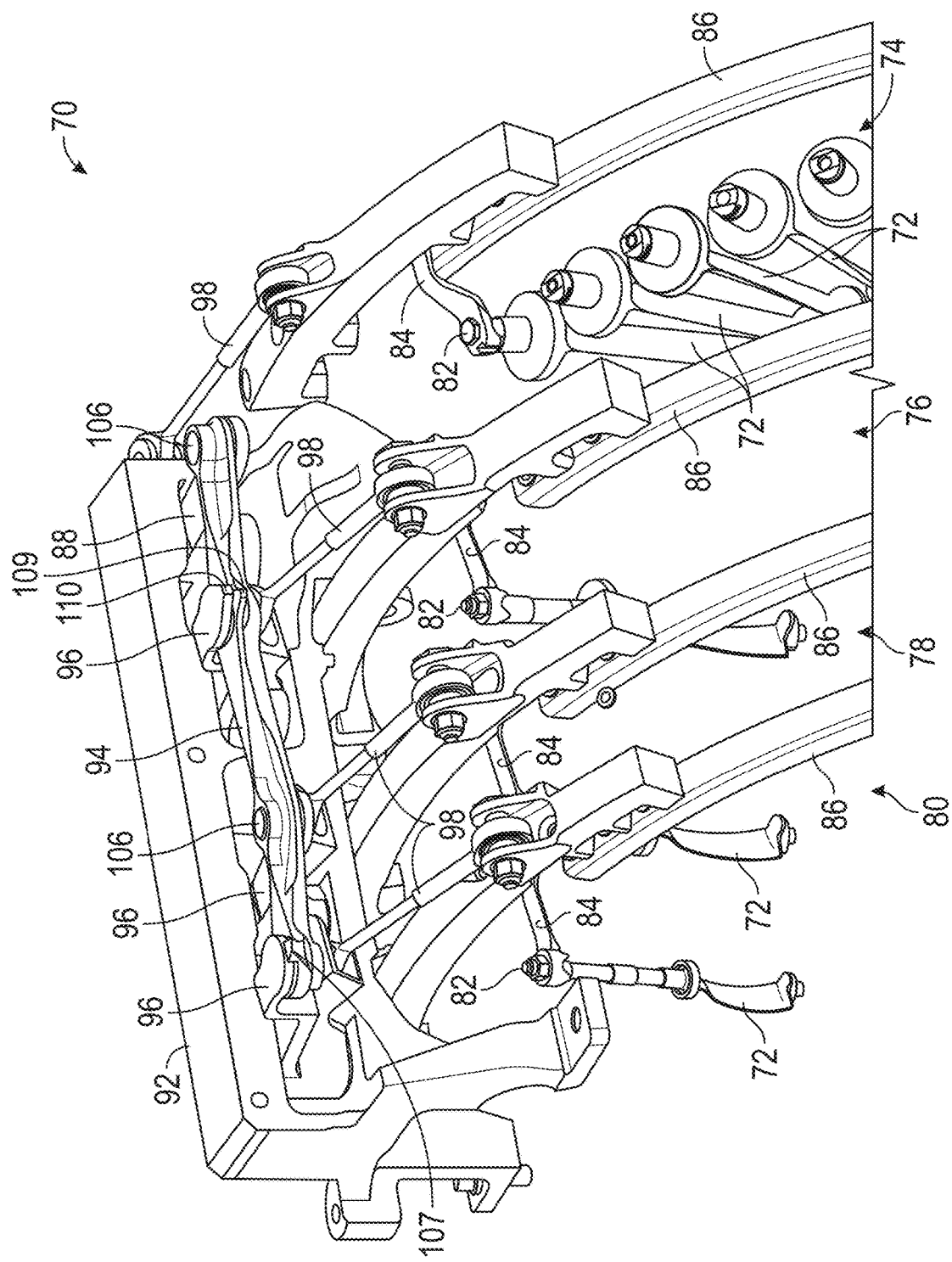
FIG. 2 is a perspective view of a portion of variable vane assembly for use in a gas turbine engine.
Figure 3:
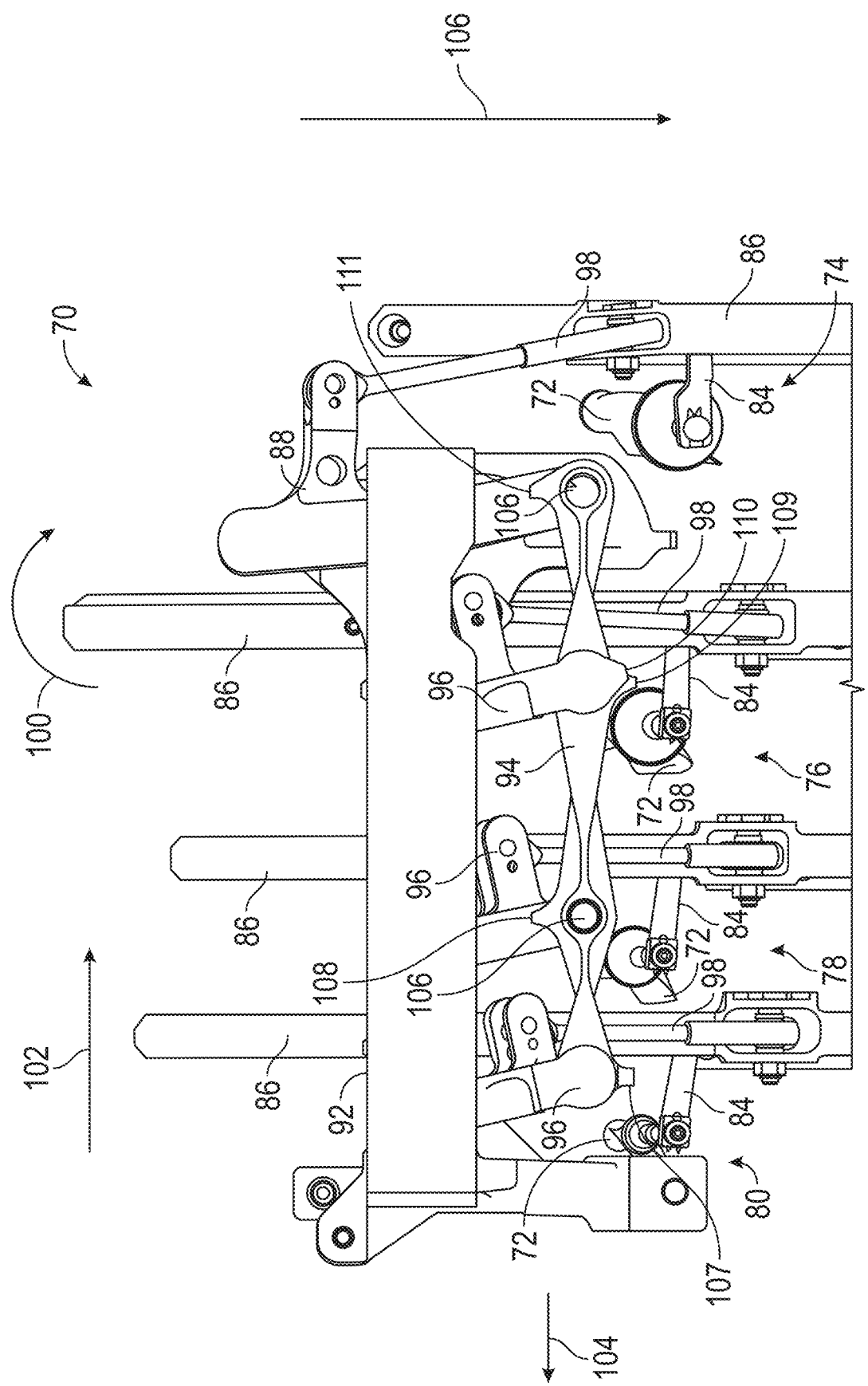
FIG. 3 is a top plane view of a portion of variable vane assembly for use in a gas turbine engine.
Figure 4:
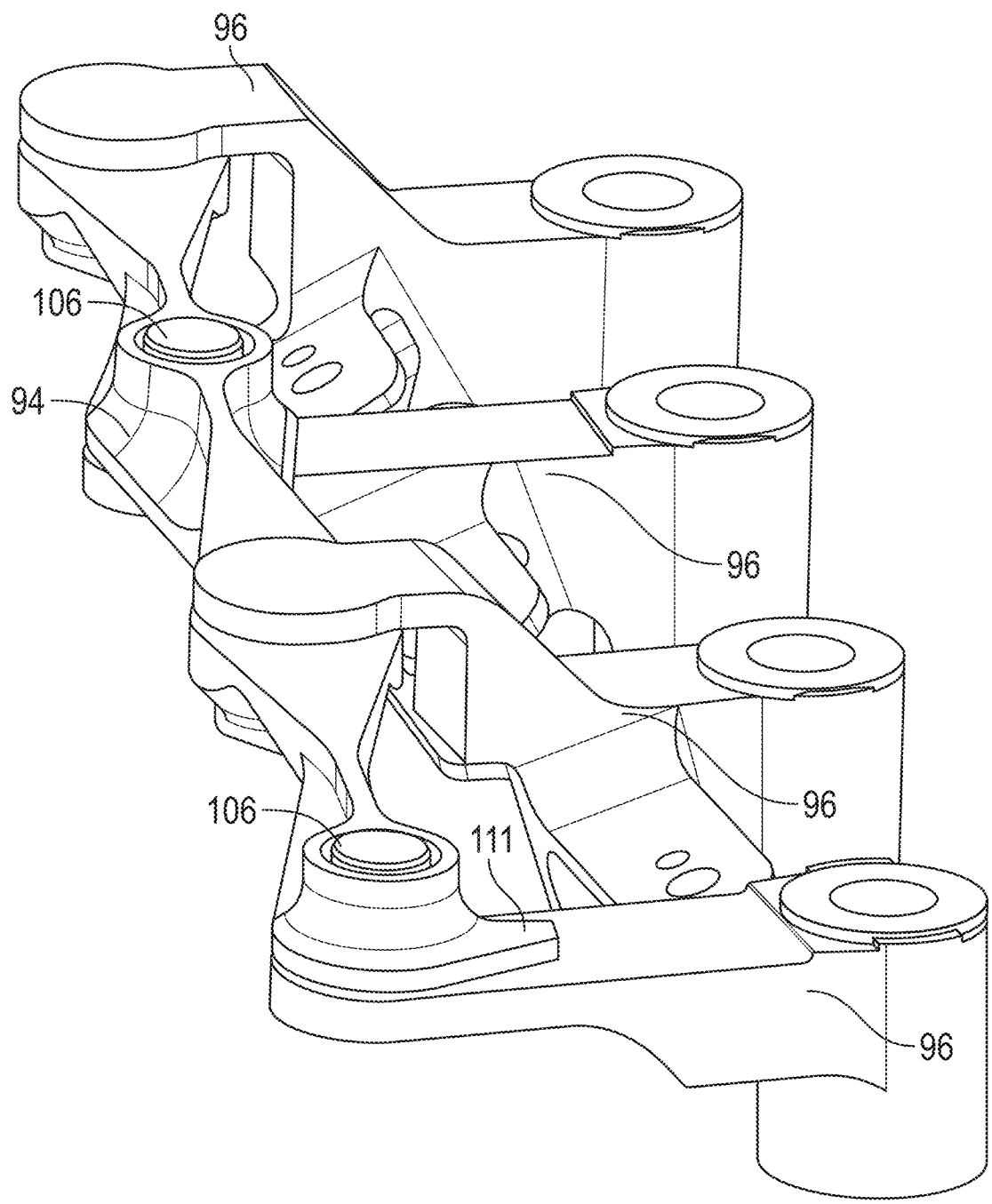
FIG. 4 is a perspective view of a portion of variable vane assembly for use in a gas turbine engine.

Referring now to FIGS. 2-4, portions of a variable vane assembly 70 for use in the gas turbine engine 20 are illustrated. The variable vane assembly 70 is typically used in the high pressure compressor 52 of engine 20. Of course, the variable vane assembly 70 may alternatively be used in the low pressure compressor 44 or both the high pressure compressor 52 and the low pressure compressor 44 of the engine 20.

The variable vane assembly 70 includes a plurality of vanes 72. Each of these vanes 72 are arranged into a plurality of stages 74, 76, 78 and 80. For simplicity, only one vane 72 of stages 76, 78 and 80 is illustrated in FIG. 2. Each of the plurality of vanes 72 are configured for rotation about their axis 82 through movement of a vane arm 84 secured to the vane 72 at one end and a clevis or sync ring 86 at the other end. Again and for simplicity, only one vane arm 84 for each of the vane stages 74, 76, 78 and 80 is illustrated. The clevis or sync ring 86 of vane stage 74 is secured to a bell crank 88 via a link 90. The bell crank 88 is also pivotally secured to a bracket 92. In addition, the bell crank 88 is also pivotally secured a self-retained linkage 94. The self-retained linkage 94 is also pivotally secured to a plurality of links or bell cranks 96. Each one of the plurality of links or bell cranks 96 are also pivotally secured to bracket 92. In addition, each one of the plurality of links or bell cranks 96 are operably coupled to a respective clevis or sync ring 86 of stages 76, 78 and 80 via a link 98 such that movement of bell crank 88 in the direction of arrow 100 will cause the self-retained linkage 94 to move in the direction of arrow 104. This movement of self-retained linkage 94 in the direction of arrow 104 will also cause links or bell cranks 96 to rotate in the direction of arrow 100 about their pivotal axis of securement to the bracket 92.

In one non-limiting embodiment, the force in the direction of arrow 102 is provided by a piston (not shown) operably coupled to the bell crank 88.

Since each one of the links or bell cranks 96 are also secured to a respective clevis or sync ring 86 of stages 76, 78 and 80 via a link 98, movement of the links or bell cranks 96 in the direction of arrow 100 will cause movement of clevis or sync rings 86 in the direction of arrow 106, which in turn will cause rotational movement of vanes 72 about axis 82 since each vane 72 is operably coupled to a respective clevis or sync ring 86 via a vane arm 84.

In order to move the vanes 72 back to their unactuated or first position. A force in a direction opposite to arrow 100 will cause movement of the clevis or sync rings 86 in a direction opposite to arrow 106, which in turn will cause an opposite rotational movement of vanes 72 about axis 82 since each vane 72 is operably coupled to a respective clevis or sync ring 86 via a vane arm 84.

In other words, application of a force in the direction of arrow 100 and in a direction opposite to arrow 100 to bell crank 88 will cause a corresponding rotational movement of vanes 72 (e.g., clockwise or counter clockwise rotation) depending on the direction of the force applied to bell crank 88.

In accordance with the present disclosure, the self-retained linkage 94 is pivotally secured to the bell cranks 88 and 96 via a stud 106 of bell cranks 88 and 96. As illustrated, each stud 106 is received or inserted into a respective opening of the self-retained linkage 94 in an alternating fashion (e.g., inserted into the openings via opposite sides of the self-retained linkage 94 in an alternating fashion). In addition, this configuration will also help to retain the self-retained linkage 94 in a proper location without additional bolts and associated shear surfaces.

In one embodiment, three or more bell cranks 88 and 96 are connected to the self-retained linkage 94. At each interface between the bell cranks 88 and 96 and the self-retained linkage 94, a stud 106 of the bell cranks 88 and 96 is rotationally received in a hole or opening of the self-retained linkage 94. The direction of the stud 106 inserted into the self-retained linkage 94 is opposite to the direction of insertion of the stud 106 of the bell crank 88 and 96 adjacent to it.

As such, each interface between the bell crank 88, 96 and the self-retained linkage 94 is held by a single shear (e.g., the interface between the self-retained linkage 94 and the stud 106 and the bell crank 88 and 96) as opposed to a double shear that encountered in a double shear design. Therefore, the number of parts for providing each interface between the bell crank 88, 96 and the self-retained linkage 94 eliminates multiple parts per each interface (e.g., the bolt, retaining part(s), and potentially an extra bushing are no longer necessary). By reducing the number of parts, the time and money needed to track, order, assemble, and inspect the parts are all decreased. In addition, interfacing surfaces between the bell crank 88, 96 and the self-retained linkage 94 are reduced, which reduces the associated costs and reduces the potential for tolerance stack up.

In one embodiment, the self-retained linkage 94 will have the studs 106 of approximately one half of the bell cranks 88, 96 inserted in a first direction and the other half inserted in a second direction, which is opposite to the first direction.

In one embodiment, the number of studs 106 extending in one direction should be approximately equal to the number of studs 106 extending in the opposite direction.

If a single shear interface between the self-retained linkage 94 and the bell crank 88, 96 is only possible in certain locations due to the available real estate in the gas turbine engine 20 and a double shear attachment interface is required, it is desirable to have the double shear attachment interface centered between two single shear interfaces or alternatively in a location that receives the highest load In an alternative embodiment, studs 106 may be located on the self-retained linkage 94 and the corresponding openings may be in the bell cranks 88 and 96. Alternatively, the studs 106 may be located on both the self-retained linkage 94 and the bell cranks 88 and 96.

In yet another non-limiting alternative embodiment, a plurality of tabs 107, 108, 109, 110 and 111 may be provided on the self-retained linkage 94 and/or the bell cranks 88 and 96 in order to provide an installer an indication that the self-retained linkage 94 is located in the proper orientation. In addition and in yet another non-limiting alternative embodiment, the self-retained linkage 94 may be formed via an additive manufacturing process in order to provide the self-retained linkage 94 with a lighter mass than that of a self-retained linkage 94 provided by other manufacturing processes.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A variable vane assembly for a gas turbine engine, comprising:
a plurality of vanes arranged into a plurality of stages, each one of the plurality of vanes being configured for rotation about an axis through movement of a vane arm secured to each one of the plurality of vanes at one end and a sync ring of each one of the plurality of stages at another end; and
a plurality of bell cranks operably coupling the sync ring of each one of the plurality of stages to a self-retained linkage via a stud of each one of the plurality of bell cranks, the stud of each one of the plurality of bell cranks being rotatably received in a corresponding opening of the self-retained linkage in an alternating fashion such that only a single shear interface is provided between each one of the plurality of bell cranks and the self-retained linkage.

2. The variable vane assembly as in claim 1, wherein each one of the plurality of bell cranks are also pivotally secured to a bracket.

3. The variable vane assembly as in claim 2, wherein each one of the plurality of bell cranks are operably coupled to the sync ring of each one of the plurality of stages via a link.

4. The variable vane assembly as in claim 1, wherein each one of the plurality of bell cranks are operably coupled to the sync ring of each one of the plurality of stages via a link.

5. The variable vane assembly as in claim 1, wherein an even number of the plurality of bell cranks are secured to the self-retained linkage.

6. The variable vane assembly as in claim 3, wherein an odd number of the plurality of bell cranks are secured to the self-retained linkage.

7. A gas turbine engine, comprising:
a fan section;
a compressor section;
a combustor section;
a turbine section; and
a variable vane assembly, the variable vane assembly, comprising:
a plurality of vanes arranged into a plurality of stages, each one of the plurality of vanes being configured for rotation about an axis through movement of a vane arm secured to each one of the plurality of vanes at one end and a sync ring of each one of the plurality of stages at another end; and
a plurality of bell cranks operably coupling the sync ring of each one of the plurality of stages to a self-retained linkage via a stud of each one of the plurality of bell cranks, the stud of each one of the plurality of bell cranks being rotatably received in a corresponding opening of the self-retained linkage in an alternating fashion such that only a single shear interface is provided between each one of the plurality of bell cranks and the self-retained linkage.

8. The gas turbine engine of claim 7, wherein each one of the plurality of bell cranks are also pivotally secured to a bracket.

9. The gas turbine engine of claim 8, wherein each one of the plurality of bell cranks are operably coupled to the sync ring of each one of the plurality of stages via a link.

10. The gas turbine engine of claim 7, wherein each one of the plurality of bell cranks are operably coupled to the sync ring of each one of the plurality of stages via a link.

11. The gas turbine engine of claim 9, wherein an even number of the plurality of bell cranks are secured to the self-retained linkage.

12. The gas turbine engine of claim 7, wherein an odd number of the plurality of bell cranks are secured to the self-retained linkage.

13. The gas turbine engine of claim 12, wherein each one of the plurality of bell cranks are also pivotally secured to a bracket.

14. The gas turbine engine of claim 7, wherein the variable vane assembly is located in a low pressure compressor of the compressor section of the gas turbine engine.

15. The gas turbine engine of claim 7, wherein the variable vane assembly is located in a high pressure compressor of the compressor section of the gas turbine engine.

16. A method of rotating a plurality of vanes of a variable vane assembly of a gas turbine, comprising:
coupling a plurality of bell cranks to a plurality of stages of the variable vane assembly via a self-retained linkage, the self-retained linkage interfacing with a stud of each one of the plurality of bell cranks, the stud of each one of the plurality of bell cranks being rotatably received in a corresponding opening of the self-retained linkage in an alternating fashion such that only a single shear interface is provided between each one of the plurality of bell cranks and the self-retained linkage.

17. The method of claim 16, further comprising pivotally securing each one of the plurality of bell cranks to a bracket.

18. The method of claim 16, wherein each one of the plurality of bell cranks are operably coupled to a sync ring of each one of the plurality of stages via a link.

19. The method as in claim 18, wherein an even number of the plurality of bell cranks are secured to the self-retained linkage.

20. The method as in claim 16, wherein an odd number of the plurality of bell cranks are secured to the self-retained linkage.

* * * * *